United States Patent [19]

Jaeger

[11] Patent Number: 5,459,245
[45] Date of Patent: Oct. 17, 1995

[54] FLUOROTRIAZINE CONTAINING NAPHTHYLAZONAPHTHYL MONOAZO REACTIVE DYES

[75] Inventor: Horst Jaeger, Leverkusen, Germany

[73] Assignee: Bayer Aktiengesellschaft, Leverkusen, Germany

[21] Appl. No.: 330,130

[22] Filed: Oct. 27, 1994

Related U.S. Application Data

[63] Continuation of Ser. No. 19,751, Feb. 18, 1993, abandoned.

[30] Foreign Application Priority Data

Feb. 27, 1992 [DE] Germany .......................... 42 06 040.0

[51] Int. Cl.⁶ .................. C09B 62/085; C09B 62/008; D06P 1/38
[52] U.S. Cl. ................ 534/635; 534/581; 534/582; 534/632; 534/634; 534/638; 8/549
[58] Field of Search .................. 534/632, 635, 534/638

[56] References Cited

U.S. PATENT DOCUMENTS

| | | | |
|---|---|---|---|
| 4,115,378 | 9/1978 | Bien et al. ...................... 534/638 X |
| 4,206,306 | 6/1980 | Bien et al. ...................... 544/181 |
| 4,740,597 | 4/1988 | Franke et al. .................. 534/632 X |
| 4,754,023 | 6/1988 | Tzikas et al. .................... 534/632 X |
| 4,988,803 | 1/1991 | Stohr et al. ...................... 534/635 |

FOREIGN PATENT DOCUMENTS

| | | |
|---|---|---|
| 0144766 | 6/1985 | European Pat. Off. . |
| 0172790 | 2/1986 | European Pat. Off. . |
| 0299967 | 7/1987 | European Pat. Off. . |
| 0299315 | 1/1989 | European Pat. Off. . |

OTHER PUBLICATIONS

Buckley, *Chemical Abstracts*, vol. 58, No. 14156a (1963).

*Primary Examiner*—Johann Richter
*Assistant Examiner*—Fiona T. Powers
*Attorney, Agent, or Firm*—Sprung Horn Kramer & Woods

[57] ABSTRACT

Reactive dyestuffs which, in the form of the free acid, have the following formula

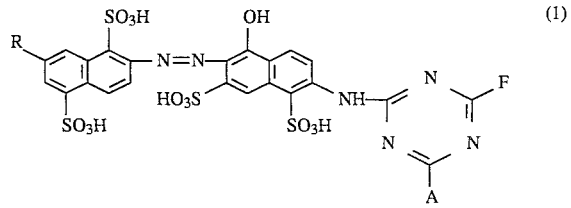

(1)

in which the substituents have the meaning given in the description, are suitable for the dyeing and printing of hydroxyl- and amido-containing materials, in particular cellulose materials.

4 Claims, No Drawings

FLUOROTRIAZINE CONTAINING NAPHTHYLAZONAPHTHYL MONOAZO REACTIVE DYES

This application is a continuation of application Ser. No. 08/019,751, filed on Feb. 18, 1993, now abandoned.

The present invention relates to new reactive dyestuffs, a process for their preparation and their use.

Reactive dyestuffs which contain, as the chromophore, an azo compound based on naphthalenesulphonic acid have already been disclosed in EP 299,315 (=U.S. Pat. No. 4,988,803).

The present invention relates to reactive dyestuffs which, in the form of the free acid, have the following formula

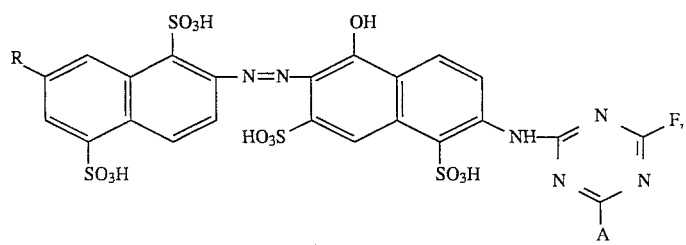

(1)

in which
R is hydrogen or sulpho,
A is a substituted or unsubstituted amino group, in particular one of the formula

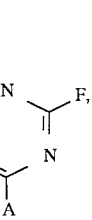

in which
$R^1$ represents hydrogen or an aliphatic, cycloaliphatic or aralyphatic radical and
$R^2$ represents $R^1$ or a heteroaryl radical or an aromatic radical, it being possible for the radicals $R^1$ and $R^2$ with or without inclusion of a heteroatom to form a ring.

Further heteroatoms for the ring formation of $R^2$ and $R^1$ are preferably O, NH, $NCH_3$, $NCOCH_3$, $N-C_2H_4SO_2CH=CH_2$, S, SO, $SO_2$.

Preferred heteroaryl radicals $R^2$ and $R^1$ are 3-aminosulpholane, 2-aminothiazole, 6-amino-2-ethylsulphonyl- benzothiazole.

In a preferred embodiment, $-NR^1R^2$ represents the radical of an aliphatic amine or of a heterocyclic amine in which $R^1$ and $R^2$ together with the joint N atom form a ring.

The aliphatic radicals represented by $R^1$ and $R^2$ are preferably alkyl radicals, in particular those having 1 to 6 C atoms, which may be interrupted by heteroatoms and are substituted or unsubstituted.

Examples of interrupting heteroatoms are:
O, S, $SO_2$, (is hydrogen, $C_1-C_4$-alkyl), $NR^3CO$, $NR^3SO_2$;

Examples of substituents are:
OH, Cl, F, COOH, $SO_3H$, $OSO_3H$, $SO_2CH=CH_2$, CN, $SO_2CH_2CH_2Cl$, $SO_2CH_2CH_2OSO_3H$, $NR^3$—Z,
in which Z represents a heterocyclic reactive group, in particular one from the monochloro- and monofluorotriazine series or fluoropyrimidine series.

The cycloaliphatic radicals $R^1$ are in particular 5- or 6-membered cycloalkyl radicals.

The araliphatic radicals $R^1$ are in particular those of the formula

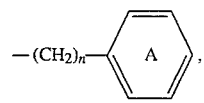

in which n is 1 to 4 and the radical A can be substituted, for example by Cl, $NO_2$, COOH, $SO_3H$, $CH_3$, $OCH_3$, $SO_2CH_2CH_2OSO_3H$, $SO_2CH=CH_2$, $CH_2SO_2CH_2CH_2OSO_3H$.

Aromatic radicals $R^2$ are in particular phenyl or naphthyl radicals which are unsubstituted or substituted, in particular by $OCH_3$, $OC_2H_5$, $OCH_2CH_2OH$, $CH_3$, $C_2H_5$, $-CH(CH_3)_2$, F, Cl, Br, COOH, $SO_3H$, $NO_2$, $SO_2CH_2CH_2OSO_3H$, $SO_2CH=CH_2$, $CH_2SO_2CH_2CH_2SO_3H$, $CH_2SO_2CH=CH_2$, NHZ, Z having the above-mentioned meaning.

Individual examples of $R^1$ or $R^2$ aliphatic radical are as follows:
$CH_3$, $C_2H_5$, $CH_2CH_2OH$, $CH_2CH_2OCH_3$, $CH_2CH_2OCH_2OC_2H_5$, $CH_2CH_2OCH_2CH_2OH$, $CH_2SO_3H$, $CH_2CH_2SO_3H$, $CH_2CH_2OSO_3H$, $CH_2COOH$, $CH_2CH_2COOH$, $CH_2CH_2SO_2CH_2CH_2OSO_3H$, $CH_2CH_2OCH_2CH_2SO_2CH_2CH_{2Cl}$, $cH_2CH_2CH_2CH_2SO_2CH=CH_2$, $CH_2CH_2NHCOCH_2CH_2COOH$, $CH_2CH_2CH_2SO_2CH_2CH_2SO_3H$, $CH_2CH_2CH_2SO_2CH=CH_2$, $CH_2CH_2CH_2SO_2CH_2CH_2Cl$,

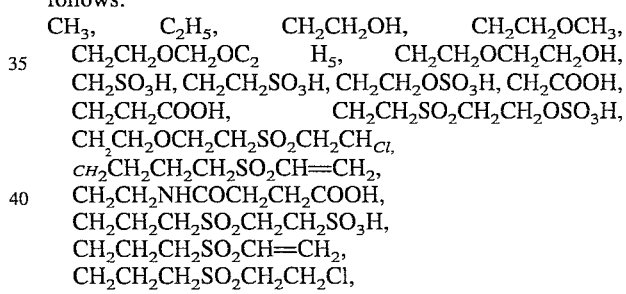

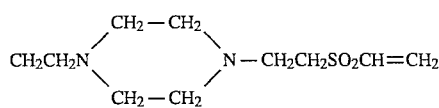

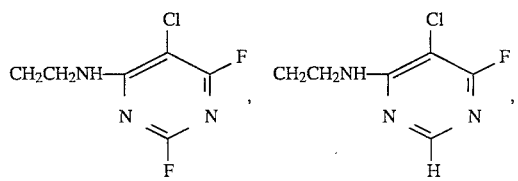

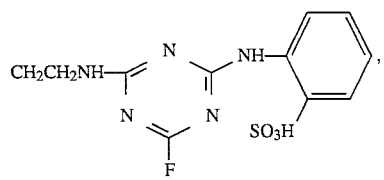

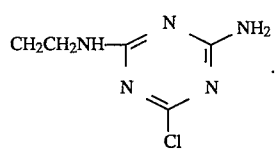
Examples of cycloaliphatic radicals $R^1$ and $R^2$ are:
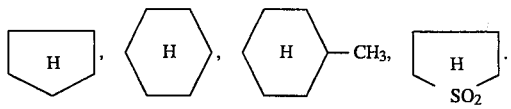
Examples of araliphatic radicals $R^1$ are:
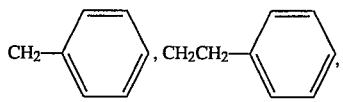
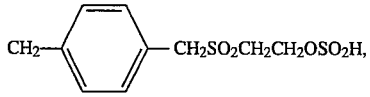
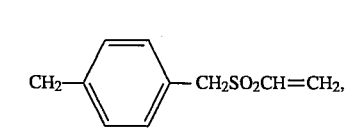
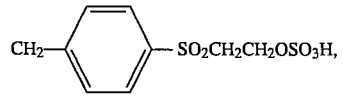
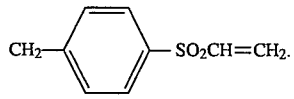
Examples of aromatic radicals $R^2$ are as follows:
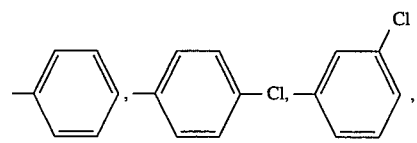
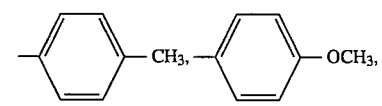
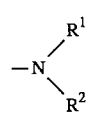
Examples or ring-closed radicals are:
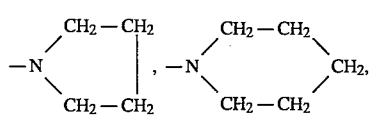

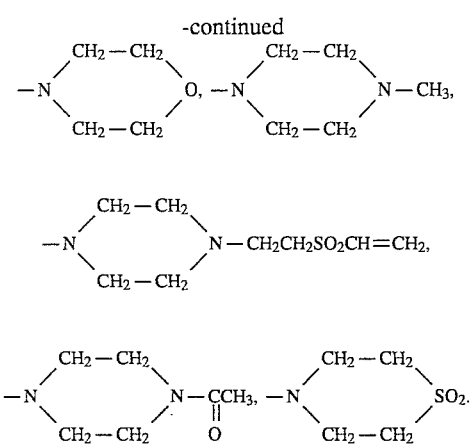

Preferred compounds in the context of the formula (1) are those in which R represents hydrogen. Further preference is given to those compounds in which $R^1$ and $R^2$, independently of one another, denote hydrogen, $C_1$–$C_4$-alkyl, which can be substituted by $OCH_3$, $OC_2H_5$, COOH, $OSO_3H$, $SO_3H$, $OCH_2CH_2SO_2CH_2OSO_3H$, $OCH_2CH_2SO_2CH=CH_2$, $OCH_2CH_2SO_2CH_2CH_2Cl$, $SO_2CH_2CH_2OSO_3H$, $SO_2CH=CH_2$; in a further preferred embodiment, $R^1$ denotes hydrogen or $C_1$—$C_4$-alkyl and $R^2$ denotes a phenyl radical, which can be substituted by Cl, $OCH_3$, $CH_3$, $SO_3H$, $NO_2$, COOH, CN, $SO_2CH_2CH_2OSO_3H$, $SO_2CH=CH_2$, $CH_2SO_2CH_2CH_2OSO_3H$, $CH_2SO_2CH=CH_2$.

In a further preferred embodiment, A represents the radical of a ring-closed amine, in particular

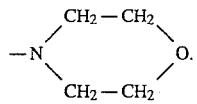

The invention furthermore relates to a process for the preparation of the dyestuffs of the formula (1), which is characterised in that first 2-amino-5-hydroxynaphthalene-1, 7-disulphonic acid is condensed with trifluorotriazine in a pH range from 2 to 6, in particular 3 to 5, and at temperatures of −5° to +20°, in particular at 0° to 5°, if appropriate in the presence of a buffer, to give a difluorotriazine compound, and subsequently a further fluorine atom is exchanged for an amine radical A and finally the resulting monofluoro compound is coupled with the diazo compound of an amine of the formula

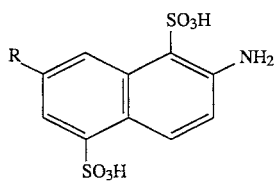

in a neutral range.

Suitable buffers are in particular the alkali metal salts of the fluorides or phosphates.

The reactive dyestuffs of the formula (1) can be isolated and processed to give useful, dry dyestuff preparations. Isolation preferably takes place at the lowest possible temperatures by salting out and filtration. The filtered dyestuffs can be dried, if appropriate by addition of a buffer mixture, for example mono- and disodiumphosphate; preferably, drying takes place at temperatures which are not excessively high and under reduced pressure. In certain cases, the dry preparations according to the invention can be prepared directly, i.e. without intermediate isolation of the dyestuffs, by spray-drying the entire preparation mixture.

The new dyestuffs are suitable for the dyeing and printing of hydroxyl- and amido-containing materials, in particular cellulose materials. They are distinguished by high reactivity and a high degree of fixation. The dyeings or prints on cellulose materials obtainable using these dyestuffs are moreover distinguished by a high stability of their fibre to dyestuff bond and by excellent stability to oxidising agents, such as peroxide- or chlorine-containing detergents. The ability of the hydrolysis products formed only to a small extent during dyeing or printing to be washed out is excellent. The dyestuffs have good wet fastness properties.

The formulae given are those of the free acids. During the preparation, the salts are in general obtained, in particular the alkali metal salts, such as sodium salts, potassium salts or lithium salts.

The weights given in the examples are those of the free acid. The colour indicator numbers given in the examples refer to the Colour Index Hue Indication Chart (Indicator Numbers).

EXAMPLE 1

31.9 g of 2-amino-5-hydroxynaphthalene-1,7-disulphonic acid are dissolved in 400 ml of water under neutral conditions. 300 g of ice are then added, and 8.8 ml of trifluorotriazine are run in while maintaining a pH of 4.0 to 4.5 with 15% strength sodium carbonate solution. A sample is taken in order to ensure that acylation is complete (diazotisation and rendering alkaline of the sample no longer gives a red colouration).

Stirring of the mixture is continued for 5 minutes, and 8.7 g of morpholine are then added while maintaining a pH of 7.5 to 8 with 15% strength sodium carbonate solution. After 10 minutes at 10°, the reaction is complete.

The reaction product of the formula

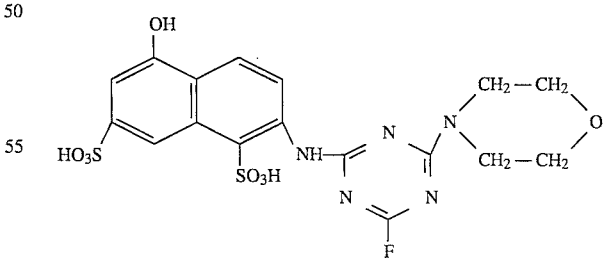

has partly precipitated.

A diazo compound obtained in the usual manner by direct diazotisation of 30.3 g of 2-aminonaphthalene-1,5disulphonic acid is added to this suspension at 5° to 10° while simultaneously maintaining the pH at 7.0 to 7.5 by sprinkling in sodium bicarbonate.

After coupling is complete, the dyestuff of the formula

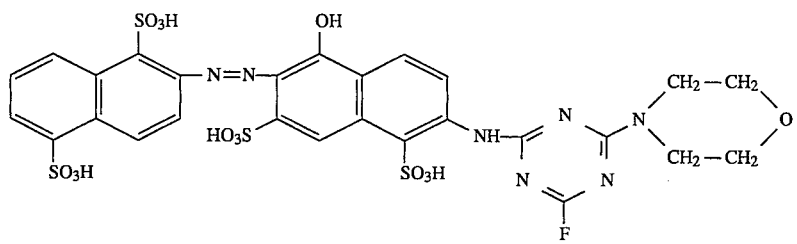

λ max=486 nm is salted out, filtered off with suction, dried and milled.

The orange-coloured dyestuff powder is readily soluble in water and dyes cotton by one of the methods customary for reactive dyestuffs in brilliant orange shades (colour indicator number 5).

Further valuable dyestuffs which dye cotton in brilliant orange shades are obtained by repeating the procedure for Example 1, using an equivalent amount of the amines listed below instead of morpholine.

| Example | Amine | Dyestuff $\lambda_{max}$ (nm) |
|---|---|---|
| 2 | Methylamine | 486 |
| 3 | Ethylamine | 486 |
| 4 | Dimethylamine | 486 |
| 5 | Diethylamine | 486 |
| 6 | Isopropylamine | |
| 7 | Aminoacetic acid | |
| 8 | Taurine | |
| 9 | N-Methyltaurine | |
| 10 | Methylaminoacetic acid | |
| 11 | β-Sulphatoethylamine | |
| 12 | β-Sulphatoethyl-β-aminoethyl sulphone | |
| 13 | β-Sulphatoethyl-γ-aminopropyl sulphone | |
| 14 | β-Methoxyethylamine | |
| 15 | β-Aminopropionic acid | |
| 16 | Methylaminomethanesulphonic acid | |
| 17 | Ethylaminomethanesulphonic acid | |
| 18 | $H_2NCH_2CH_2OCH_2CH_2SO_2CH_2CH_2OSO_3H$ | |
| 19 | $H_2NCH_2CH_2OCH_2CH_2SO_2CH=CH_2$ | |
| 20 | $H_2NCH_2CH_2OCH_2CH_2SO_2CH_2CH_2Cl$ | |
| 21 | N-Methylbenzylamine | |
| 22 | 1-(β-Aminoethyl)-4-(β-sulphatoethylsulphonyl)-benzene | |
| 23 | 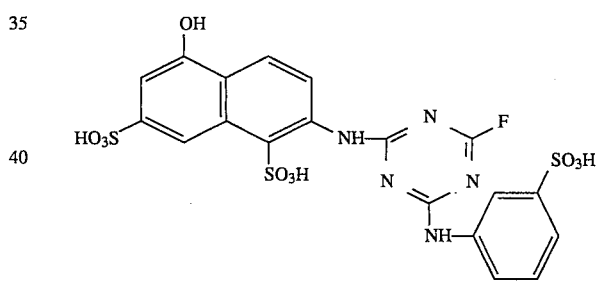 | |
| 24 | Cyclohexylamine | |
| 25 | Ethanolamine | |
| 26 | N-Methylethanolamine | |
| 27 | Diethanolamine | |
| 28 | 3-Methoxypropylamine | |

EXAMPLE 29

31.9 g of 2-amino-5-hydroxynaphthalene-1,7-disulphonic acid are dissolved in 400 ml of water under neutral conditions. 300 g of ice are then added, and 8.8 ml of trifluorotriazine are run in while maintaining a pH of 4.0 to 4.5 with 15% strength sodium carbonate solution. Stirring is continued for 5 minutes, and a neutral solution of 17.3 g of m-sulphanilic acid is then added while maintaining a pH of 5.0 to 5.5 with 15% strength sodium carbonate solution. During acylation, the temperature is allowed to rise to 15° to 20°. A diazo compound obtained in the usual manner by diazotisation of 30.3 g of 2-aminonaphthalene-1,5-disulphonic acid is added to the resulting solution of the reaction product of the formula

at 5° to 10°, while simultaneously maintaining the pH at 7.0 to 7.5 by sprinkling in sodium bicarbonate. After coupling is complete, the dyestuff of the formula

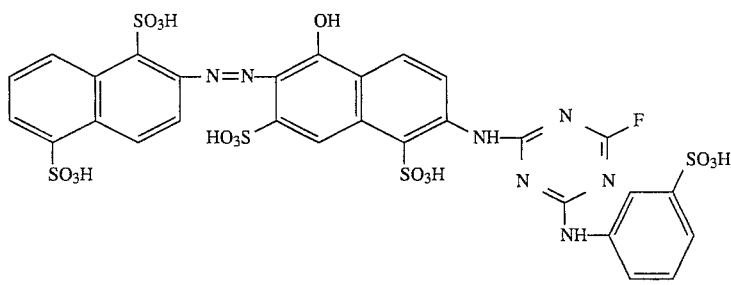

is salted out, filtered off with suction, dried and milled.

The orange-coloured dyestuff powder is readily soluble in water and dyes cotton by one of the methods customary for reactive dyestuffs in brilliant orange shades (colour indicator number 5).

Further valuable dyestuffs which dye cotton in brilliant orange shades are obtained by repeating the procedure for Example 29, using an equivalent amount of the amines listed below instead of m-sulphanilic acid.

| Example | Amine | Dyestuff $\lambda_{max}$(nm) |
|---|---|---|
| 30 | Aniline | 488 |
| 31 | N-Ethylaniline | 486 |
| 32 | N-Methylaniline | 486 |
| 33 | 4-Chloroaniline | 488 |
| 34 | 3-Chloroaniline | 488 |
| 35 | 2-Chloroaniline | |
| 36 | o-Toluidine | |
| 37 | p-Toluidine | |
| 38 | p-Sulphanilic acid | |
| 39 | o-Anisidine | |
| 40 | p-Anisidine | |
| 41 | 4-β-Sulphatoethylsulphonylaniline | |
| 42 | 3-β-Sulphatoethylsulphonylaniline | |
| 43 | β-Sulphatoethyl-4-aminobenzyl sulphone | |
| 44 | 3-Aminobenzoic acid | |
| 45 | 4-Aminobenzoic acid | |
| 46 | 1-Amino-4-methyl-3-β-sulphatoethyl-sulphonylbenzene | |
| 47 | 1-Amino-4-vinylsulphonylbenzene | |
| 48 | 1-Amino-3-vinylsulphonylbenzene | |
| 49 | 2-Amino-6-β-sulphatoethylsulphonylnaphthalene-8-sulphonic acid | |

EXAMPLE 50

31.9 g of 2-amino-5-hydroxynaphthalene-1,7-disulphonic acid are condensed by the procedure of Example 1 with trifluorotriazine and then with morpholine. A diazo compound obtained in the usual manner by direct diazotisation of 38.3 g of 2-aminonaphthalene-1,5,7-trisulphonic acid is added to the resulting suspension of the monofluorotriazinyl compound at 5° to 10°, while simultaneously maintaining the pH at 7.0 to 7.5 by sprinkling in sodium bicarbonate. After coupling is complete, the dyestuff of the formula

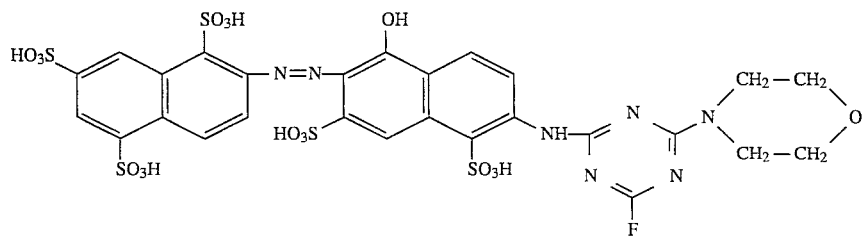

is salted out, filtered off with suction, dried and milled.

The orange-coloured dyestuff powder is readily soluble in water and dyes cotton in brilliant orange shades (colour indicator number 5).

If this example is repeated, except that an equivalent amount of the amines mentioned in Example 2 to 28 and 29 to 49 is used instead of morpholine, a pH of 5.0 to 5.5 being maintained for the last-mentioned aromatic amines during condensation with the difluorotriazine compound, this likewise results in reactive dyestuffs which dye cotton in orange (colour indicator number 4).

EXAMPLE 51

31.9 g of 2-amino-5-hydroxynaphthalene-1,7-disulphonic acid are condensed with trifluorotriazine by the procedure of Example 1.5.0 g of ethylenediamine is added to the solution of the resulting difluorotriazine compound at 0° while maintaining a pH of 5.5 to 6.5. After 2 to 3 hours, condensation is complete. A diazo compound obtained in the usual manner by diazotisation of 30.3 g of 2-aminonaphthalene-1,5-disulphonic acid is added to the reaction product of the formula

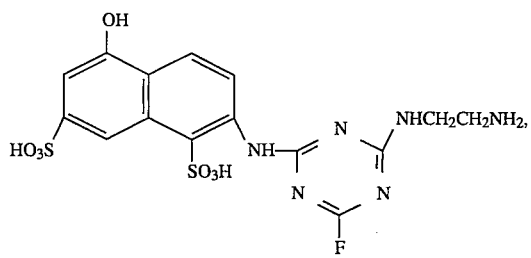

which is largely present as a suspension, while simultaneously maintaining the pH at 7.0 to 7.5 by sprinkling in sodium bicarbonate. After coupling is complete, the dyestuff of the formula

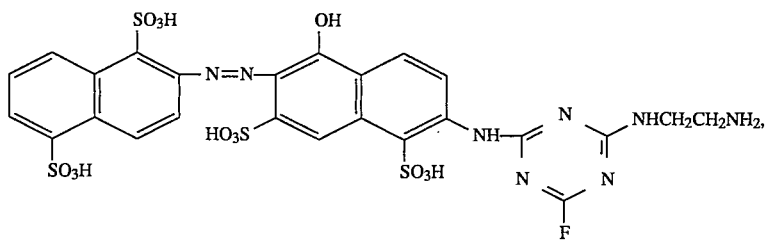

which has precipitated as a sparingly soluble compound, is filtered off with suction and stirred again in 1 l of water. 16.9 g of 2,4,6-trifluoro-5-chloropyrimidine are added dropwise at 0° to 5° while maintaining a pH of 7.5 to 8.0 with dilute sodium hydroxide solution. During condensation, the dyestuff goes into solution. After condensation is complete (thin-layer chromatogram), the dyestuff is salted out, filtered off with suction, dried and milled. The orange-coloured powder is readily soluble in water and dyes cotton in clear orange shades (colour indicator number 5).

Further valuable reactive dyestuffs which dye cotton in orange are obtained by repeating this example, using an equivalent amount of the reactive components listed below instead of 2,4,6-trifluoro-5-chloropyrimidine and carrying out the condensation within the temperature range given.

| Example | Reactive component | Temperature |
| --- | --- | --- |
| 52 | 4,6-Difluoro-5-chloro-pyrimidine | 10–15° |
| 53 | 2,4-Dichloro-6-aminotriazine | 25–30° |
| 54 | 2,4-Dichloro-6-(2'-sulpho-phenylamino)-triazine | 25–30° |
| 55 | 2,4-Difluoro-6-(2'-sulpho-phenylamino)-triazine | 0–5° |
| 56 | 2,4-Difluoro-6-(2'-chloro-5'-sulphophenylamino)-triazine | 0–5° |

I claim:

1. A reactive dyestuff which, in the form of a free acid, has the following formula

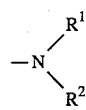

in which

R is hydrogen or sulpho,

A is $$-N\begin{array}{c}R^1\\R^2\end{array}$$

in which

R$^1$ is hydrogen or C$_1$–C$_4$-alkyl, which is optionally substituted by OCH$_3$, OC$_2$H$_5$, COOH, OSO$_3$H, SO$_3$H, OCH$_2$CH$_2$SO$_2$CH$_2$OSO$_3$H, OCH$_2$CH$_2$SO$_2$CH=CH$_2$, OCH$_2$CH$_2$SO$_2$CH$_2$CH$_2$Cl, SO$_2$CH$_2$CH$_2$OSO$_2$H, or SO$_2$CH=CH$_2$, R$^2$ is hydrogen, C$_1$–C$_4$-alkyl which is optionally substituted by OCH$_3$, OC$_2$H$_5$, COOH, OSO$_3$H, SO$_3$H, OCH$_2$CH$_2$SO$_2$CH$_2$OSO$_3$H, OCH$_2$CH$_2$SO$_2$CH=CH$_2$, OCH$_2$CH$_2$SO$_2$CH$_2$CH$_2$Cl, SO$_2$CH$_2$CH$_2$OSO$_2$H, or SO$_2$CH=CH$_2$, or phenyl which is optionally substituted by Cl, OCH$_3$, CH$_3$, SO$_3$H, NO$_2$, COOH, CN, SO$_2$CH$_2$CH$_2$OSO$_3$H, SO$_2$CH=CH$_2$, CH$_2$SO$_2$CH$_2$CH$_2$OSO$_3$H, or CH$_2$SO$_2$CH=CH$_2$, or R$^1$ and R$^2$ together form a morpholine ring.

2. A reactive dyestuff according to claim 1 wherein

R$^1$ is hydrogen or C$_1$–C$_4$-alkyl, and

R$^2$ is phenyl which is optionally substituted by Cl, OCH$_3$, CH$_3$, SO$_3$H, NO$_2$, COOH, CN, SO$_2$CH$_2$CH$_2$OSO$_3$H, SO$_2$CH=CH$_2$, CH$_2$SO$_2$CH$_2$CH$_2$OSO$_3$H, or CH$_2$SO$_2$CH=CH$_2$.

3. A reactive dyestuff according to claim 1 wherein the dyestuff is of the formula
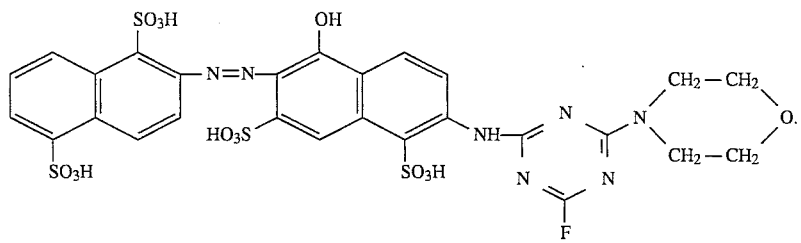
4. Process for the dyeing or printing of hydroxyl or amido-containing materials with a reactive dyestuff, by applying thereto a reactive dyestuff according to claim 1.
* * * * *

UNITED STATES PATENT AND TRADEMARK OFFICE
CERTIFICATE OF CORRECTION

PATENT NO. : 5,459,245
DATED : October 17, 1995
INVENTOR(S) : Horst Jaeger

It is certified that error appears in the above-indentified patent and that said Letters Patent is hereby corrected as shown below:

Title Page     [21] Appl. No.:    Delete " 330,130 " and substitute -- 330,230 --

Signed and Sealed this

Nineteenth Day of March, 1996

Attest:

BRUCE LEHMAN

Attesting Officer     Commissioner of Patents and Trademarks